United States Patent [19]
Bollig

[11] Patent Number: 6,082,237
[45] Date of Patent: Jul. 4, 2000

[54] DEVICE FOR CROPPING AND DEFLECTING A WIRE-ROD STRAND

[75] Inventor: Georg Bollig, Krefeld, Germany

[73] Assignee: SKET Walzwerkstechnik GmbH, Magdeburg, Germany

[21] Appl. No.: 09/140,558

[22] Filed: Aug. 26, 1998

[30] Foreign Application Priority Data

Sep. 3, 1997 [DE] Germany .......................... 197 38 470

[51] Int. Cl.[7] ........................................... B26D 7/06
[52] U.S. Cl. .................. 83/106; 83/950; 83/105
[58] Field of Search .................. 83/950, 340, 305, 83/106, 105, 344, 107, 698.51, 699.51

[56] References Cited

FOREIGN PATENT DOCUMENTS 866441 12/1952 Germany .
288116 3/1991 Germany .
218 852 10/1993 Germany .

Primary Examiner—Kenneth E. Peterson
Assistant Examiner—Omar Flores Sánchez
Attorney, Agent, or Firm—Collard & Roe, P.C.

[57] ABSTRACT

A device for cropping and deflecting a wire-rod strand moving at high speed, comprising two rotating cutter heads, each having a cutter and arranged one on top of the other, one cutter being a leading cutter and the other cutter being a trailing cutter, and a switch tube arranged between the two cutter heads, for forcibly guiding wire-rod strand between the two cutter heads to separate a head piece of the wire-rod strand not conforming to the quality requirements from the strand. There is an outlet having guide channels separated from each other for receiving the head piece of the wire-rod strand and the wire-rod strand. There is a fin arranged on each of the cutter heads, a leading fin directly in front of the leading cutter in the direction of rotation of the corresponding cutter head, and a trailing fin directly behind the trailing cutter in the direction of rotation of the corresponding cutter head. The axes of rotation of the cutter heads are inclined in a horizontal plane by an angle of inclination toward the rolling direction such that before, during and after separation of the head piece, an end of the head piece is deflected by the leading fin to one side and an end of the strand is deflected before, during and after separation by the trailing fin to the opposite side by forced guidance. The deflection takes place sequentially over time.

5 Claims, 3 Drawing Sheets

DEVICE FOR CROPPING AND DEFLECTING A WIRE-ROD STRAND

BACKGROUND OF THE INVENTION

1. Field of the Invention

This invention relates to a device for cropping and deflecting a wire-rod strand moving at high speed, in which the strand is forcibly guided through a switch tube between two cutter heads arranged on top of each other and equipped with a cutter each, so that a head end of the strand that does not meet quality requirements is separated from the strand, whereas the separated crop end and the sound wire-rod strand are passed into a down stream outlet section comprising separated guide channels.

2. The Prior Art

It is known to crop or divide a wire-rod strand moving at mill speed in rolling mills for improving the entry conditions for the initial pass in the roll stands downstream, or in order to cut off parts of the strand that fail to meet quality requirements, and to dispose of these parts as scrap.

Adapted to the high rolling speeds of the strand is, e.g., cropped or divided by flying shears such as shown in European patent No. EP 0 297 313 B1 and German patent No. DE 35 23 046 A1.

With their high speeds and with the minimum switching time periods required for switches downstream, these shears are necessarily highly complicated mechanical systems. High driving powers are required for accelerating the associated switch systems and the cutters, and the components of the switches are subject to considerable wear. Because of rolling speeds in excess of 100 m/s and due to the high forces of acceleration, it is technically difficult to control these systems, and a high technical effort is needed to manage their operation.

In practical applications, the switch systems are made very long in order to achieve appropriate switching timer periods for the switches.

DD 145 237 discloses designing the outlet part, which consists of a plurality of guide channels, in such a way that it can be swung horizontally. The wire-rod strand is then guided to machines arranged downstream, or the separated ends are admitted to a suitable scrap disposal installation. A linear drive controls the swinging.

However, also this measure fails to satisfactorily solve the problem of short swinging time periods amounting to ⅒th of a second.

Furthermore, German Patent Application No. DE 32 37 171 A1 discloses a guiding system comprising a segment-like deflector for deflecting the wire-rod strand, whereby the deflector is brought into contact with the wire-rod strand in order to deflect it into the appropriate guide channels. This device has the drawback that due to the fact that the strand is in direct contact with the deflector, the possibility of swerving of the strand moving at high speeds, which may cause damage, cannot be absolutely excluded.

A different solution to the problem of short switching time periods for downstream switch systems has been proposed by DD 218 852 in which the cropped piece of strand and the sound wire-rod strand are guided into various guide channels after the separation cut has been made. The device operates in such a way that in the course of the dividing process, the cropped piece of strand is pressed down by the leading top cutter, and the following head of the sound strand being rolled is lifted by the trailing bottom cutter. This measure supports the movement of the piece of scrap into the downwardly arranged channel of the outlet section, as well as the movement of the following sound strand into the wire-rod strand channel arranged on top. The cutter heads are designed so that starting from the center breast area of the cutter, the diameter of the cutter head expands toward the opposite back side of the cutter and ends at the level of the top edge of the cutter.

This device appears to be suitable to accommodate the high rolling speeds. However, the specific cutter heads required are very expensive to design and manufacture. Furthermore, the effect of deflection of the strand depends also on the steel grade and upon the rolling conditions. Thus, the desired deflection is therefore not always achieved reliably, because forced guidance of the strand after is has been cut is missing.

SUMMARY OF THE INVENTION

It is therefore an object of the present invention to overcome the drawbacks of the prior art and to create a device for cropping and deflecting a wire-rod strand that, at a low technical effort, cutting the strand with subsequent deflection of the cropped piece and of the sound wire-rod strand into separate guide channels of a fixed outlet section, even at rolling speeds of more than 100 m/s.

It is another object of the invention to provide such a device that eliminates the need for complicated and cost-intensive switch systems in the outlet section that are susceptible to failure.

These and other objects are accomplished according to the invention by a device for cropping and deflecting a wire-rod strand moving at high speed that forcibly guides the wire-rod strand by a switch tube between two cutter heads each having a cutter and arranged one on top of the other. The head end of the wire-rod strand not conforming to the quality requirements is separated and the separated cropped piece as well as the sound wire-rod strand run into an outlet section arranged downstream, which has separated guide channels. In the direction of rotation, a fin is arranged on the circumference of the cutter head with the leading cutter directly laterally in front of the cutter. A second fin is firmly arranged on the circumference of the cutter head with the trailing cutter after the cutter in the direction of rotation, but on the opposite side.

The axes of rotation of the two cutter heads are inclined in the horizontal plane by an angle β relative to the rolling direction so that before, during and after the dividing cut, the end of the leading scrap piece is deflectable by the leading fin to the one side. In addition, before, during and after the dividing cut, the head of the trailing sound wire-rod strand is deflectable by the trailing fin to the other side, in each case with the coverage changing over time due to the forced guidance. In a preferred embodiment, the axes of rotation of the cutter heads are inclined in the horizontal plane by an angle β of 3° to 7°, and most preferably 5° relative to the rolling direction.

Furthermore, the length of the fins measured over the circumference of the cutter heads should amount to between ¼th to ⅙th of the circumference of the cutter heads. Another appropriate means provides for the rotary speed of the cutter heads approximately corresponds to the speed of the moving strand in order to minimize the relative speed between the strand and the fins.

The present invention is an improvement over the prior art because it is both simple and inexpensive to manufacture and operate, and ensures reliable cutting of the strand, and separating it into the scrap piece and the sound strand. The present invention also ensures quality-determined deflection thereof, with the required switching time period into separate guide channels of stationary outlet section.

BRIEF DESCRIPTION OF THE DRAWINGS

Other objects and features and advantages of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 2:
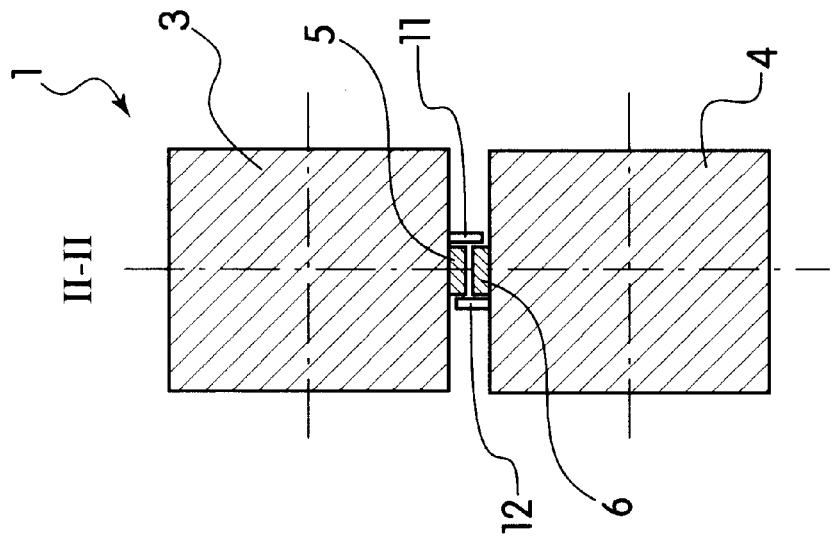
FIG. 2 shows section II—II of FIG. 1.
Figure 1:
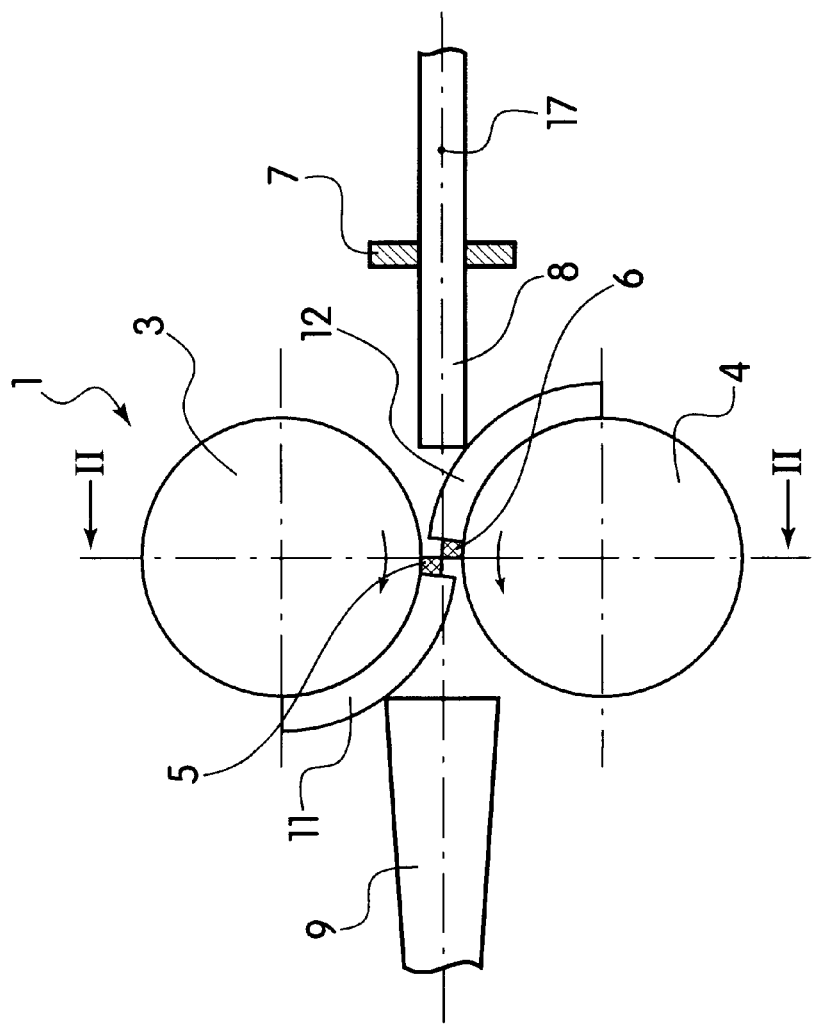
FIG. 1 shows a side view o the device for cropping and deflecting a wire-rod strand according to the invention.

Referring now in detail to the drawings and, in particular, FIGS. 1 and 2 show a device 1 for cropping and deflecting a wire-rod strand 2 which is mainly arranged in the pass line downstream of a cooling unit or upstream of a laying head not shown in detail. According to FIG. 1, device 1 consists of two cutter heads 3 and 4 arranged on top of each other. Cutters 5 and 6, respectively, are mounted on the circumferences of cutter heads 3 and 4, respectively. Cutter 5 of cutter head 3 is referred to as the leading cutter 5, and cutter 6 of cutter head 4 is referred to as the trailing cutter 6.

Furthermore, a switch tube 8, which is horizontally displaceable in a rocker 7, is arranged upstream of device 1. Viewed in the rolling direction, device 1 is followed by a fixed outlet section 9 consisting of two guide channels 9a and 9b, which are separated from each other by a guide wedge 10, as shown in FIG. 3.

According to the invention, a fin 11 is firmly arranged on the circumference of cutter head 3 with leading cutter 5 and, viewed in the direction of rotation, is mounted directly laterally in front of cutter 5. A fin 12 is firmly arranged on the circumference of cutter head 4 with trailing cutter 6, and when viewed in the direction of rotation, is mounted on the opposite side, downstream of cutter 6. It was found to be useful if the length of fins 11, 12 each measured over the circumference of cutter heads 3, 4, amounted to between ¼th to ⅙th of the circumference of the associated cutter heads 3, 4.

Figure 3:
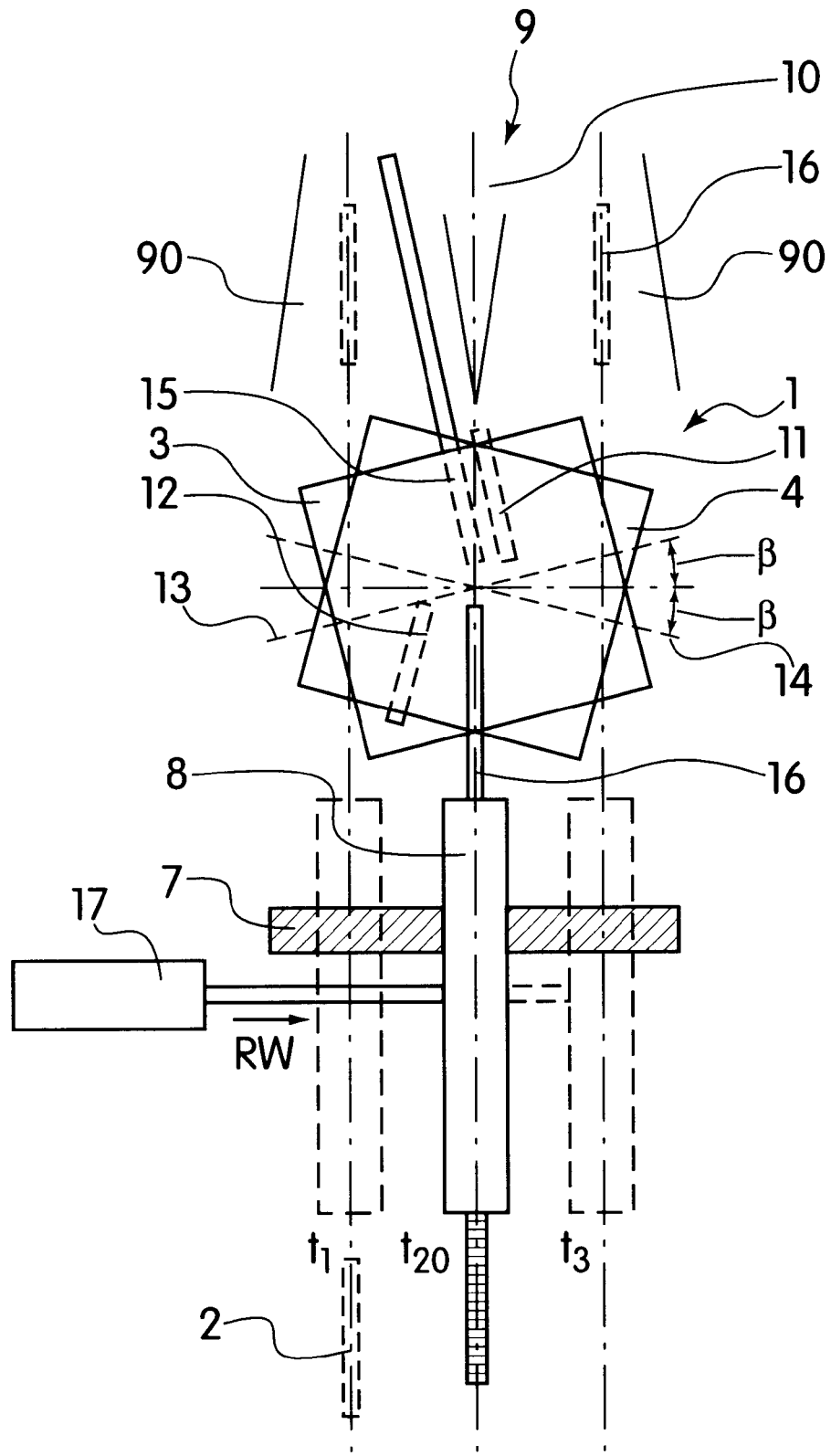
FIG. 3 shows a top view of the invention as per FIG. 1.

Moreover, It is essential to the invention that, as shown in FIG. 3, the axes of rotation 13 and 14 of the two cutter head 3 and 4 are inclined in the horizontal plane by an angle of inclination β toward the rolling direction, in a way such that before, during and after the dividing cut, the leading fin 11 deflects the end of the leading cropped piece 15 of the wire-rod strand 2 to one side, and that before, during and after the dividing cut, the trailing fin 12 deflects the head end of the trailing sound strand 16 of the wire-rod strand 2 to the other side by forced guidance. This deflection takes place with coverage $I_1$ and $I_2$, respectively, that changes over time. Axes of rotation 13, 14 cutter heads 3, 4 are preferably inclined in the horizontal plane by an angle of inclination β of from 3° to 7°, and most preferably 5° toward the rolling direction.

Further, it has been found to be important that the rotary speed of cutter heads 3, 4 correspond approximately to the speed of the moving wire-rod strand 2 in order to minimize the relative speed between wire-rod strand 2 and fins 11, 12, and thus the wear on fins 11, 12.

The device operates as follows: As shown in FIG. 3, at a point in time $t_1$, the tip of wire-rod strand 2 is guided through switch tube 8 and past the left side of trailing fin 12 on the left side into guide channel 9a for guiding cropped piece 15.

To initiate the cut for separating cropped piece 15 from sound wire-rod strand 16, switch tube 8 is started within displacement rocker 7 to move in the horizontal plane in moving direction Rw via linear drive 17. Tube 8 moves according to a defined distance/time curve and at a defined point in time, which in turn is synchronized with a defined angular position of cutter heads 3 and 4, so that tube 8 as well as wire-rod strand 2 reach the cutting position within the acting range of cutters 5, 6 at a point in time $t_{20}$.

The movement of switch tube 8 and cutter heads 3, 4 is synchronized such that wire-rod strand 2 completes its travel transversely to the rolling direction within about a ¾ turn or rotation of cutter heads 3, 4. Leading fin 11, however, has not yet reached the range of wire-rod strand 2, so that coverage and possibly impacting of strand 2 on fin 11 in the course of the transverse movement are excluded.

Figure 4:
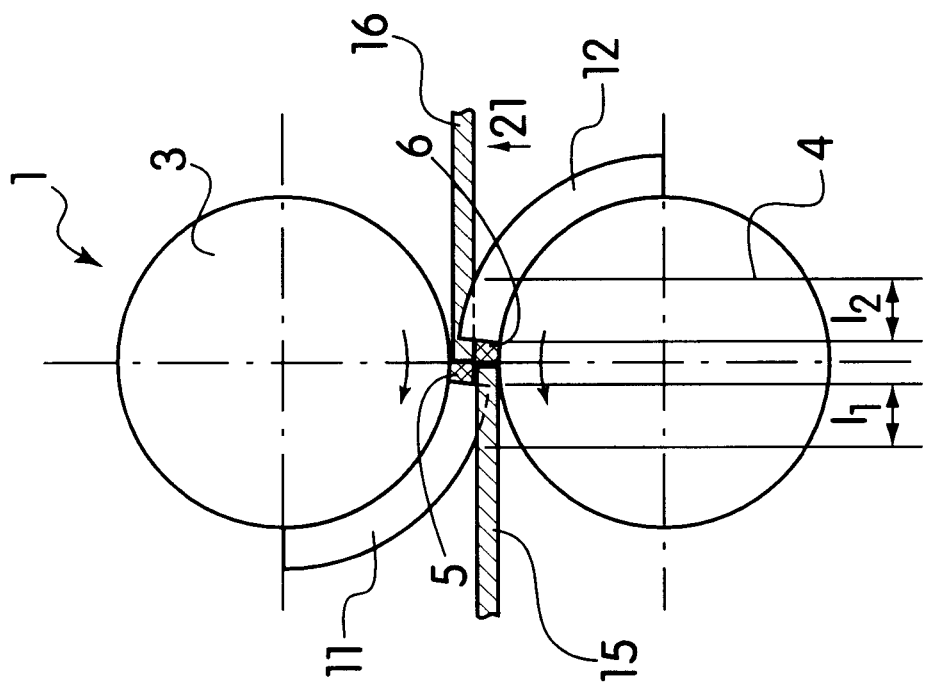
FIG. 4 shows a side view of a wire-rod strand being cut at a point in time $t_{21}$ with the device according to the invention.

As shown in FIG. 4, the dividing cut actually takes place at a point in time $t_{21}$, whereby leading fin 11 covers wire-rod strand 2 mainly the trailing end of cropped piece 15, and positively influences or supports both the dividing cut itself as well as the passage of the wire rod through the forced guidance arrangement. The support is provided by the inclination of the axis of rotation 13 of leading cutter head 3. This inclination is essential to the invention.

Figure 5:
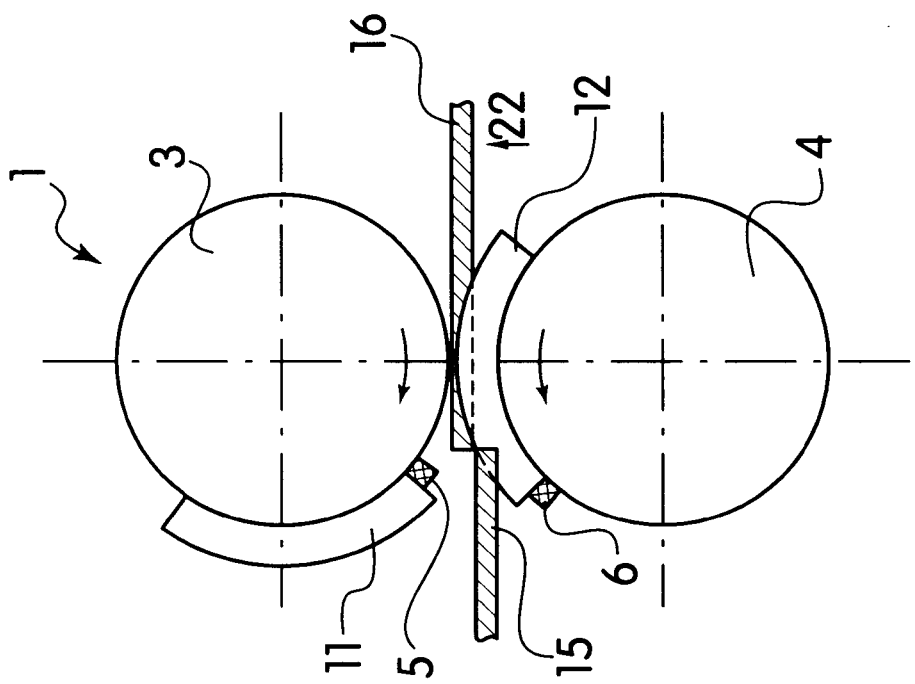
FIG. 5 shows a side view of the invention at a point in time $t_{22}$ immediately after a strand was cut.

Immediately following the dividing cut, at time t22, as shown in FIG. 5, the end of the leading cropped piece 15 continues to run into guide channel 9a and is deflected at this time by the leading fin 11 by forced guidance, first with increasing and subsequently with decreasing coverage $I_1$ and is supported against swerving around guide wedge 10.

At the same time, the head part of trailing sound strand 16 is deflected by trailing fin 12 which also provides forced guidance, toward the opposite side into guide channel 9b for guiding strand 16, first with increasing and subsequently with decreasing coverage $I_2$. In this case too, the deflecting and supporting effect described above is ensured.

Once the head end of sound strand 16 has reached the associated guide channel 9b, switch tube 8 is moved forward in direction Rw, so that wire-rod strand 2 leaves the cutting range of device 1 and at time t3 assumes a position that ensures almost straight-line guidance of wire-rod strand 16 into guide channel 9b of outlet section 9.

After sound strand 16 has completed its passage through switch tube 8, the latter is returned to its home position (time $t_1$) in the break between rolling passes. For liner operation of strand 16 as required, electro-hydraulic actuators are considered to be suitable for giving the speed to ensure constant transverse movement of switch pipe 8 from its position at time $t_1$ to its position of rest at time $t_3$.

At a rolling speed of 100 m/s and with a cutter head diameter of about 800 mm, the time for one rotation of cutter heads 3, 4 amounts to $(0.8 \times \pi):100=0.0025$ second. Therefore, switch tube 8 has to pass the distance from the starting position at time t1 to the cutting position at time t2 in approximately $0.75 \times 0.025=0.019$ second.

With a cutter head diameter of 800 mm and an angle of inclination β of axes of rotation 13, 14 of cutter heads 3, 4 of 5°, the distance to be traveled amounts to a maximum of 80 mm. Accordingly, acceleration of switch tube 8 at a ¾ turn of cutter heads 3, 4 of 0.08 m:0.019 s=4.2 m/s must be ensured.

Accordingly, while only one embodiment of the present invention has been shown and described, it is obvious that many changes and modifications may be made thereunto without departing from the spirit and scope of the invention.

What is claimed is:

1. A device for cropping and deflecting a wire-rod strand moving at high speed, comprising:

two rotating cutter heads, each having a cutter and arranged one on top of the other, one cutter being a leading cutter and the other cutter being a trailing cutter, each of said cutter heads having an axis of rotation;

a switch tube arranged between the two cutter heads, said switch tube forcibly guiding the wire-rod strand between the two cutter heads to separate a head piece of the wire-rod strand not conforming to the quality requirements from the strand;

an outlet having guide channels separated from each other, said outlet receiving the head piece of the wire-rod strand and the wire-rod strand;

a fin arranged on each of the cutter heads, a leading fin directly in front of the leading cutter in the direction of rotation of the corresponding cutter head and a trailing fin directly behind the trailing cutter in the direction of rotation of the corresponding cutter head, wherein the axes of rotation of said cutter heads are inclined in a horizontal plane by an angle of inclination toward the rolling direction such that before, during and after separation of the head piece, an end of the head piece is deflected by the leading fin to one side and an end of the strand is deflected before, during and after separation by the trailing fin to the opposite side by forced guidance, wherein the deflection takes place sequentially.

2. The device according to claim 1, wherein the axes of rotation are inclined in the horizontal plane by an angle of inclination of from 3° to 7° toward the rolling direction.

3. The device according to claim 2, wherein the axes of rotation are inclined in the horizontal plane by an angle of inclination of 5° toward the rolling direction.

4. The device according to claim 1, wherein the fins have a length equal to from ⅙ to ¼ the circumference of the cutter heads.

5. The device according to claim 1, wherein the circumferential speed of the cutter heads corresponds to the speed of the moving wire-rod strand to minimize the relative speed between the wire-rod strand and the fins.

* * * * *